O. & E. JOHNSON.
EXPANSIBLE BOLT.
APPLICATION FILED FEB. 28, 1914.
1,115,205.
Patented Oct. 27, 1914.
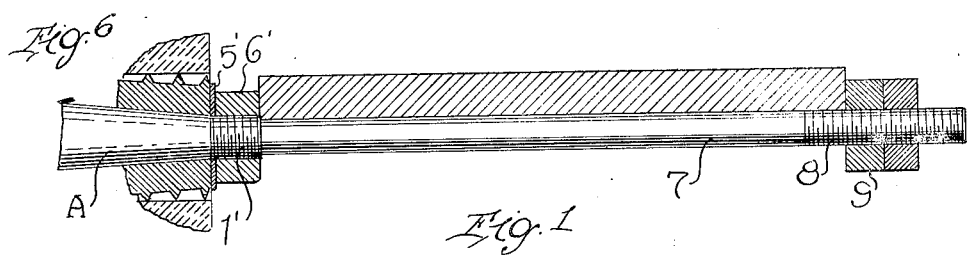
Fig. 6
Fig. 1
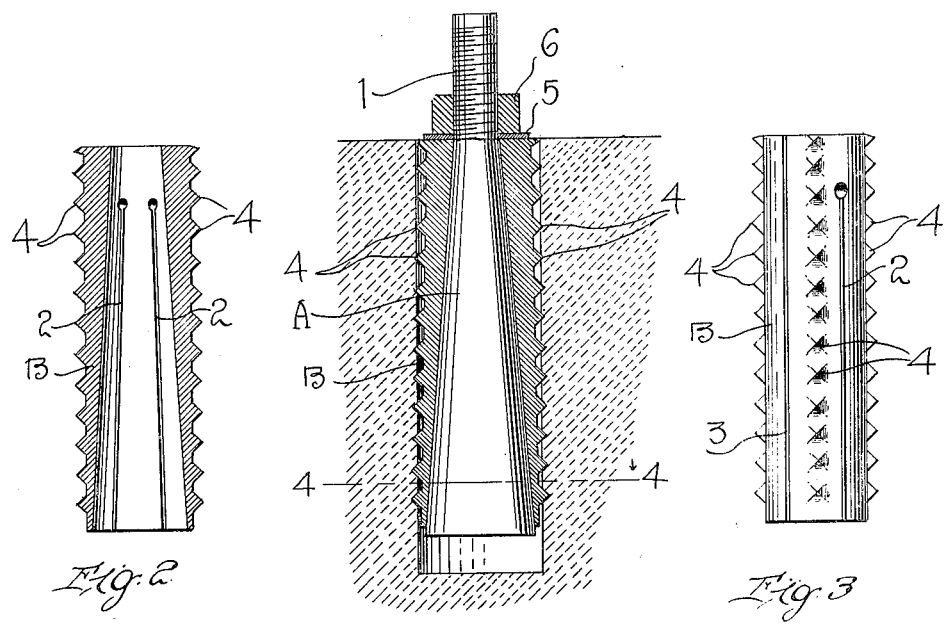
Fig. 2
Fig. 3
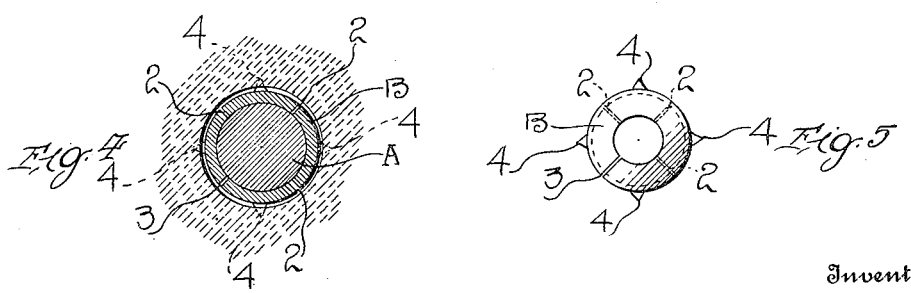
Fig. 4
Fig. 5
Inventors
OTTO JOHNSON
EDWARD JOHNSON
Witnesses
By Watson E. Coleman
Attorney

UNITED STATES PATENT OFFICE.

OTTO JOHNSON AND EDWARD JOHNSON, OF DULUTH, MINNESOTA.

EXPANSIBLE BOLT.

1,115,205.  Specification of Letters Patent.  Patented Oct. 27, 1914.

Application filed February 28, 1914. Serial No. 821,770.

*To all whom it may concern:*

Be it known that we, OTTO JOHNSON and EDWARD JOHNSON, citizens of the United States, residing at Duluth, in the county of St. Louis and State of Minnesota, have invented certain new and useful Improvements in Expansible Bolts, of which the following is a specification, reference being had to the accompanying drawings.

This invention relates to new and useful improvements in expansion bolts, an object thereof being to construct bolts of this character to make the same more convenient to use and so that they will afford a more secure hold in the holes drilled therefor in stone walls, than bolts of this class as heretofore constructed.

A further object of this invention is the provision of an expansible bolt which will securely support awnings, water pipes, sign boards, etc., upon brick, stone and concrete walls, and it consists in the novel construction, combination and arrangement of parts as will be hereinafter more fully set forth, claimed, and illustrated in the accompanying drawings, in which—

Figure 1 is a top view of our device partly in section. Fig. 2 is a longitudinal section of the sleeve. Fig. 3 is a plan view thereof. Fig. 4 is a transverse section of the device. Fig. 5 is an end view of the sleeve. Fig. 6 is a fragmentary view showing a slightly modified form of the bolt proper.

Referring more particularly to the drawing, the letter A represents the body of the bolt, or the bolt proper, and B the sleeve. The inner end of the bolt is conical in shape, the bolt tapering from its inner end to the threaded portion 1 thereof. The sleeve B is provided with a plurality of slits 2 which extend from its outer end to points adjacent the inner end thereof, and is also provided with a slot 3 which extends the entire length of the sleeve. The bore of the sleeve is tapered its entire length, the bore of the sleeve being smallest at its outer end where it is complimentary to the circumference of the threaded portion of the bolt. The outer face of the sleeve B is provided between the slots with longitudinal rows of sharpened studs or projections 4 so that when the sleeve is expanded by being forced inwardly upon the bolt, the projections will engage in the wall of the hole and securely hold the bolt within the hole.

In using our improved bolt, a hole is drilled in a wall or other desired structure, the hole being preferably of substantially the same diameter as the diameter of the largest portion of the cone, whereupon the sleeve is slipped upon the bolt, and the bolt and sleeve are inserted into the hole provided therefor. A washer 5 is provided to bear against the outer end of the sleeve B, and a nut 6 is then threaded upon the bolt A against the washer 5 whereby the sleeve is forced inwardly upon the cone shaped portion of the bolt so that the portions of the sleeve between the slots will expand and cause the projections 4 to engage in the wall. Should the hole in the wall or other structure be made larger than the largest diameter of the bolt, so that the outer end of the sleeve where the bore is of the smallest diameter is forced inwardly upon the cone-shaped portion of the bolt, it will be seen that the sleeve will be allowed to expand its entire length owing to the slot 3 which extends the entire length of the sleeve. From the above it will be seen that our bolt is practicable for use in holes of various sizes and that when once the bolt is securely fastened within the hole, it cannot be removed therefrom without removal of the nut 6 from the bolt proper.

In Fig. 6 of the drawing, a slight modification of our invention is illustrated, so that when a long bolt is needed to project from the wall or other support, the portion of the bolt projecting from the wall will not have to be threaded its entire length so that a nut may be threaded thereupon to force the sleeve inwardly upon the cone shaped portion of the bolt. In this construction, the bolt proper A, is provided outwardly of the threaded portion 1' thereof, with a reduced extension 7, the outer extremity of which is threaded as at 8 for a portion of its length to receive a nut 9. From this construction, it will be seen that a plank or other device may be secured upon the outwardly extending portions of several of the bolts, and the devices to secure the planks to the bolts may be supported upon the bolts by the nuts 9 which are threaded upon the threaded extremities of the extensions 7.

From the above description, taken in connection with the accompanying drawing, it will be seen that the sleeve will engage the bore of the hole in the wall its entire length if it is necessary to so expand the sleeve, owing to the arrangement of the studs or projections 4 in longitudinal series between the slits in the sleeve.

It will be understood that minor changes in construction may be made without departing from the spirit of our invention or sacrificing any of its advantages, as set forth in the appended claim.

Having thus fully described our invention, what we claim as new and desire to secure by Letters Patent is—

A bolt having a tapered portion at one end thereof, the threads of said bolt extending from its opposite end to the tapered portion thereof, a sleeve slidably arranged upon the bolt, the bore of said sleeve being tapered to substantially the same degree as the tapered portion of the bolt, projections formed on said sleeve, and said sleeve being provided with a longitudinal slit therein extending from end to end of the sleeve.

In testimony whereof we hereunto affix our signatures in the presence of two witnesses.

OTTO JOHNSON.
EDWARD JOHNSON.

Witnesses:
JOHN A. FORSMAN,
AXEL JOHNSON.